United States Patent [19]
Kuryluk

[11] Patent Number: 5,824,210
[45] Date of Patent: Oct. 20, 1998

[54] SEPARATION OF MINERALS

[76] Inventor: Michael H. Kuryluk, 71 Ilsley Ave. Unit 10, Dartmouth, N.S., Canada, B3B 1L5

[21] Appl. No.: 681,700
[22] Filed: Jul. 29, 1996

Related U.S. Application Data

[63] Continuation-in-part of Ser. No. 470,994, Jun. 6, 1995, Pat. No. 5,564,574.

[30] Foreign Application Priority Data

May 28, 1996 [CA] Canada ................................. 2177555

[51] Int. Cl.$^6$ ............................... B03B 1/00; B03B 5/66
[52] U.S. Cl. .............................................. 209/3; 209/159
[58] Field of Search .................................. 209/158–161, 209/3

[56] References Cited

U.S. PATENT DOCUMENTS

| 1,429,480 | 9/1922 | Allen . |
| 1,483,371 | 2/1924 | Miller . |
| 2,519,781 | 8/1950 | Morris . |
| 2,907,455 | 10/1959 | Sasaki . |
| 3,512,220 | 5/1970 | Hund et al. . |
| 3,519,353 | 7/1970 | Franz et al. . |
| 3,550,773 | 12/1970 | Villani et al. . |
| 3,869,903 | 3/1975 | Beach et al. . |
| 4,039,433 | 8/1977 | Peterson . |
| 4,055,491 | 10/1977 | Porath-Furedi . |
| 4,554,066 | 11/1985 | Turbitt et al. . |
| 4,789,464 | 12/1988 | Kuryluk . |
| 5,013,358 | 5/1991 | Ball et al. . |
| 5,244,492 | 9/1993 | Cyr . |
| 5,372,650 | 12/1994 | Lahoda et al. . |

FOREIGN PATENT DOCUMENTS

| 489047 | 12/1952 | Canada . |
| 1210735 | 9/1986 | Canada . |
| 2142747 | 2/1995 | Canada . |
| WO 96/08324 | 3/1996 | European Pat. Off. . |
| 36 12313 A1 | 10/1987 | Germany . |
| WO96/22834 | 8/1996 | WIPO . |

OTHER PUBLICATIONS

Kuryluk Mineral Separator Concentrator—Nov. 1994 (Nova Scotia Department of the Environment) pp. 1–19.
Nova Scotia Business Journal—Jan. 1994—pp. M2–M3 (selected extracts).
Phase Remediation Incorporated Brochure—5 pgs. (no date).

Primary Examiner—Karen M. Young
Assistant Examiner—Thuy V. Tran

[57] ABSTRACT

The separation of different minerals based on differences in density, surface tension effects and general relative settling rates of the different media over a range of particle sizes is effected in a unique hydraulic mineral separator system. The system and process are particularly useful in the separation of mercury from mercury contaminated soils, sands, gravels, clays and process sludges, (such as chlor-alkali sludges). Sonic vibrations are used to enhance recovery of finely divided mercury and conditioning agents are also used to advantage to reduce surface tension effects and further enhance recovery.

35 Claims, 8 Drawing Sheets

SEPARATION OF MINERALS

This is a continuation-in-part of my U.S. patent application Ser. No. 08/470,994 filed Jun. 16, 1995, the disclosure of which is incorporated herein by reference thereto now U.S. Pat. No. 5,564,574.

This invention relates to the separation of different media based on differences in density, surface tension effects and general relative settling rates of the different media over a range of particle sizes.

The process described is applicable to various minerals that must be separated for various reasons. In particular, one of the most important and useful separations that the system or process has been developed for is the separation of mercury from mercury contaminated soils, sands, gravels, clays and process sludges, (such as chlor-alkali sludges).

Many sites in the world have become contaminated to at least some degree with heavy metals, especially mercury, as a result of previous and/or on going industrial operations owing to accidents and/or occasional leaks or spills. In some instances the potential environmental impact is minimal; in others it is serious and could represent a danger to large numbers of people. Mercury is one of the heavy metals that could fall into this latter category (i.e. dangerous to the environment).

Clean up of such industrial wastes in an efficient manner represents a continuing challenge for industry and a moral obligation for everyone associated with industry and engineering. Systems are being used and improvements are being made in these systems or processes in an effort to ensure that we can eventually clean up our environment.

Thus, the invention broadly relates to a process for the separation of higher density minerals from lower density minerals comprising supplying material in the form of a mixture of liquid and particulate material in a selected particle size range to a hydraulic mineral separator; maintaining a generally upwardly flowing stream of liquid in said separator while said mixture is supplied to the upwardly flowing stream such that higher density minerals fall downwardly by gravity forces against the upwardly flowing steam while the lower density minerals are moved upwardly by said stream; and removing the downwardly moving higher density minerals from said separator through a lower discharge opening while the upwardly moving lower density minerals are removed via an upper outlet opening.

It is significant and possibly vital factor in the handling of mercury contaminated material that one of the basic physical aspects or properties of mercury must be contended with and managed properly. This characteristic is that of the mercury possessing a very strong tendency to break up into extremely fine particles when it is processed or agitated by physical means such as screening, pumping or any handling that involves attrition or any rapid movement, shaking or distortion of the mercury by applied forces during handling or processing. If the cleaning of the contaminated material is to be successful it is vitally important that (a) a minimum of this fine and often residue coated or "floured" mercury is produced, (b) that, if produced, that it be controlled before it escapes to the discharge water and into the water treatment circuit. If any mercury is lost as extremely fine or "floured" mercury it is then in a form most dangerous to the environment and could most readily enter the food chain. The significance environmentally of eliminating this general problem of fine mercury particles discharge or escape cannot be overstated. It is likely, in fact, that if the problem of very minor carry over of extremely fine mercury is not basically solved we will be creating a more difficult clean up problem in the future.

Accordingly, an important aspect of the invention, in cases wherein the higher density, (higher specific gravity) mineral is mercury, (a portion of which is in the form of very fine or residue coated mercury particles which tend not to settle downwardly within the separator), provides for the application of sonic vibrations to the liquid and mixture contained in the hydraulic separator to induce the mercury particles to coalesce together and form larger particles which more readily settle downwardly toward the lower outlet end of the separator thereby to enhance the recovery of the mercury.

According to a further aspect of the invention there is provided apparatus for the separation of higher density minerals from lower density minerals comprising a hydraulic mineral separator including: means defining an upright flow passage; means for supplying process liquid to said passage to maintain a generally upwardly moving stream of liquid therein during use; means for supplying a mixture of liquid and particulate material to be separated to said passage; an overflow means above said passage for discharging liquid and lower density particles; a discharge means below said passage for discharging liquid and higher density particles which have moved down by gravity against the upflowing stream of liquid; and vibrator means for effecting sonic vibrations in the mixture of particulate material within said passage to cause coalescence of selected finely divided metallic minerals to enhance recovery of same via said discharge means.

In the preferred form of the invention the apparatus is adapted for the recovery of finely divided metallic mercury particles.

By utilizing sonic vibrations to effect coalescence of the finely divided mercury, it has been found that the carry-over of this extremely fine mercury can be dramatically reduced, thereby cutting down on the size and cost of the final water treatment process by a major degree. This technique enables the previously contaminated material to be returned safely to the natural environment.

Another problem concerns the fact that very stubborn retention of fine mercury is encountered when processing organic type particles, especially such as peat and related materials. In these cases the fine mercury cannot be removed by normal washing procedures even when combined with extended agitation in water. It therefore became necessary to treat this type of material in a different manner, in order to obtain removal of the combined mercury.

Accordingly, a further aspect of the invention involves the conditioning of the material to be treated and separated with a suitable conditioning compound. The conditioning compound may be added to process water that is sprayed on the mercury contaminated material, starting at the feed hopper and then in the screening stages. The conditioning agent alters the surface tension differential and other physical characteristics between the mercury and the organic and semi-organic material in which it is trapped, having an almost immediate effect on the mixture that results in the release or freeing up of the mercury.

The preferred conditioning compound is hexa meta phosphate, which compound is introduced at relatively low percentage levels as described hereafter.

In the preferred form of the invention, the processes described above are utilized in conjunction with the improved mineral separator as described and claimed in my pending Canadian application Serial No. 2,142,747 filed on Feb. 17, 1995 and entitled MINERAL SEPARATOR, naming Michael Kuryluk as inventor and assigned to Phase Remediation Incorporated. The corresponding U.S. patent application was filed on Jun. 16, 1995 receiving Ser. No. 08/470,994, the disclosure of which patent application is incorporated herein by reference thereto.

In the preferred practice of the invention, the sonic vibrational forces are applied to selected chambers of the mineral separator to enhance the recovery of the finely divided mercury. The vibrational system is preferably controlled automatically such that it can be adjusted to perform most effectively for the process conditions at the time.

In cases where organic particles such as peat and related materials are involved, the conditioning agent noted above is utilized in conjunction with the above apparatus to great advantage thereby to release or free-up the entrapped mercury particles.

Preferred embodiments of the invention will now be described with reference to the accompanying drawings.

BRIEF DESCRIPTION OF THE VIEWS OF DRAWINGS

DETAILED DESCRIPTION OF PREFERRED EMBODIMENTS

Figure 1:
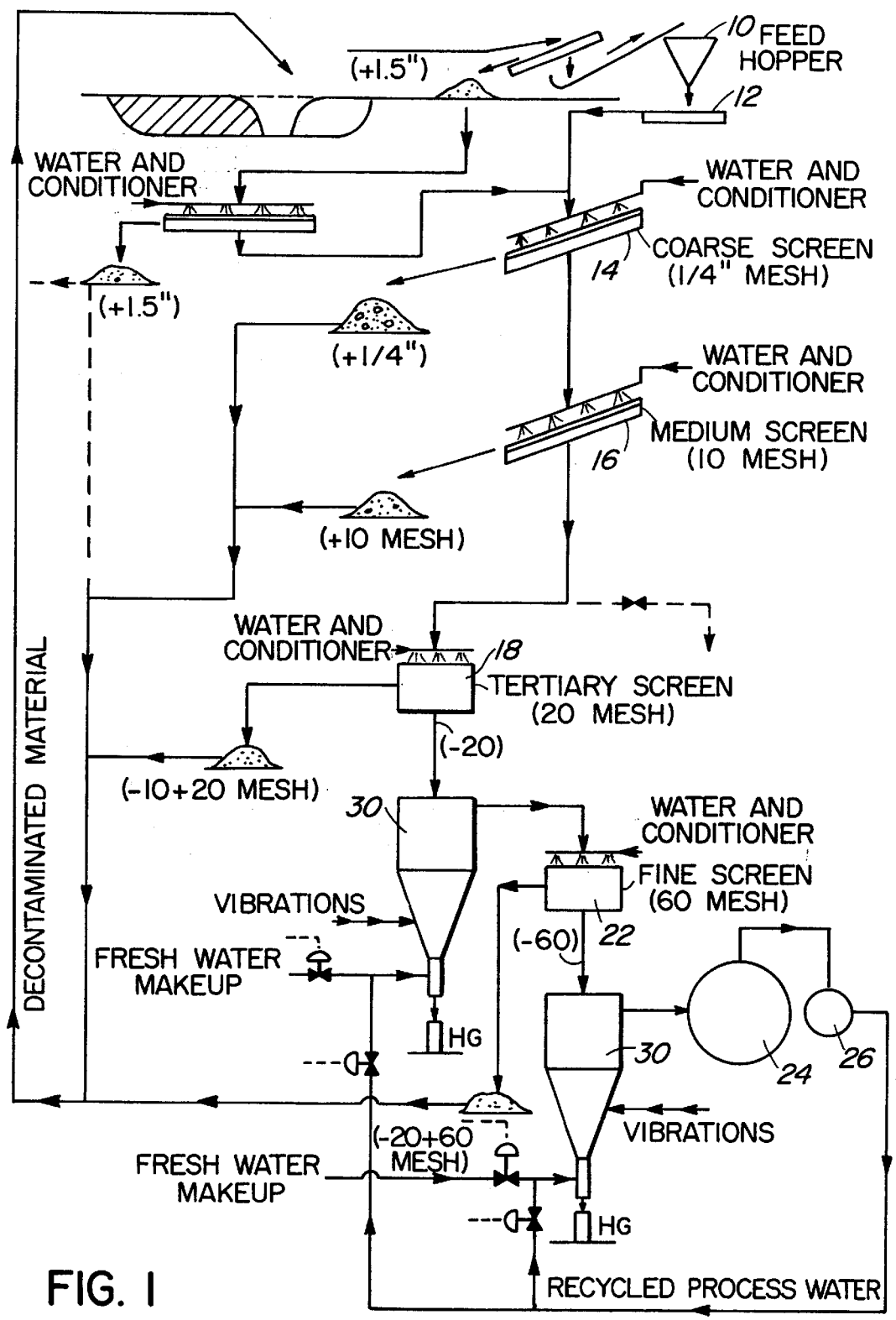
FIG. 1 is a schematic flow diagram showing a typical separation process in accordance with the invention.

Referring firstly to the schematic flow diagram of FIG. 1, the major stages in the overall process are illustrated. The infeed, which will be assumed to be mercury-contaminated media, is fed on a relatively steady continuous basis via a hopper 10 and a feeder 12 over an automatic scale. A limited amount of water may be added at this time (usually with a surface active compound, to be described hereafter), to improve the separation of the mercury from the material being fed.

The mixture now flows or is conveyed onto a coarse vibrating screen 14 (e.g. ¼" mesh) where the material is spray water washed along with the addition of any desired amount of surface active compound. The oversize cleaned material (¼" size or less) is conveyed to storage or rescreened if necessary before being stored or returned to its origin.

Undersized material from the first stage or stages of screening is passed on to another screen 16 of finer mesh (e.g. about 10 mesh) for similar treatment. The coarse or oversized clean material is returned or conveyed to storage or rescreened if necessary before being stored or returned to its origin.

The undersized material from the second stage or stages of screening is routed to a series of vibrating screens 18, preferably of the "Sweco" type, where the material is again washed by water sprays (including any desired surface active compound) over finer mesh screens (20 to 30 mesh). The undersized material (mainly process water and fine silt together with some entrained mercury) is routed to at least one mineral separator 30 or, as shown, to a plurality of such separators 30 for removal of the mercury and its recovery. As shown, the overflow from the first mineral separator 30 again passes into a series of vibrating screens 22 of the Sweco type, these screens being very fine (e.g. about 60 mesh). At the same time the material is washed with sprays of water together with the surface active compound if required. The oversized material (greater than 60 mesh) is again conveyed to storage or rescreened if necessary before being stored or returned to its origin. The very fine material left, which is of less than 60 mesh size, forms the infeed for the second hydraulic mineral separator 30 and the overflow from this second mineral separator, consisting of process water and relatively light mercury-free particulate material, is put into a settling and final water treatment tank 24. Suitable chemicals may be added at this point to assist in the settling treatment, following which the process water is passed through an activated carbon bed 26 with the outflowing process water being recycled and fed back into the first and second mineral separators 30 along with any required fresh makeup water (either fresh or salt).

Practically pure mercury is recovered from the lower small outlet end of each separator 30 for storage and re-use.

It was mentioned previously that in the preferred form of the invention, the hydraulic mineral separator used is essentially that as described and claimed in the pending Canadian patent application Serial No. 2,142,747 filed Feb. 17, 1995 entitled MINERAL SEPARATOR naming Michael H. Kuryluk as inventor and in its corresponding U.S. counterpart patent application Ser. No. 08/470,994 filed Jun. 16, 1995. Before proceeding further, a description of this mineral separator will be incorporated herein and the improvements which have been made to it will be described thereafter.

By way of general explanation, the description contained below makes reference to "heavy" particles and "light" particles or similar terms. It is to be understood that the terms "heavy" and "light" refer to particles or materials having, relative to one another, high or low densities or specific gravities; they do not refer to the mass of the particles. A large "light" particle could have more mass than a smaller "heavy" particle.

Figure 2:
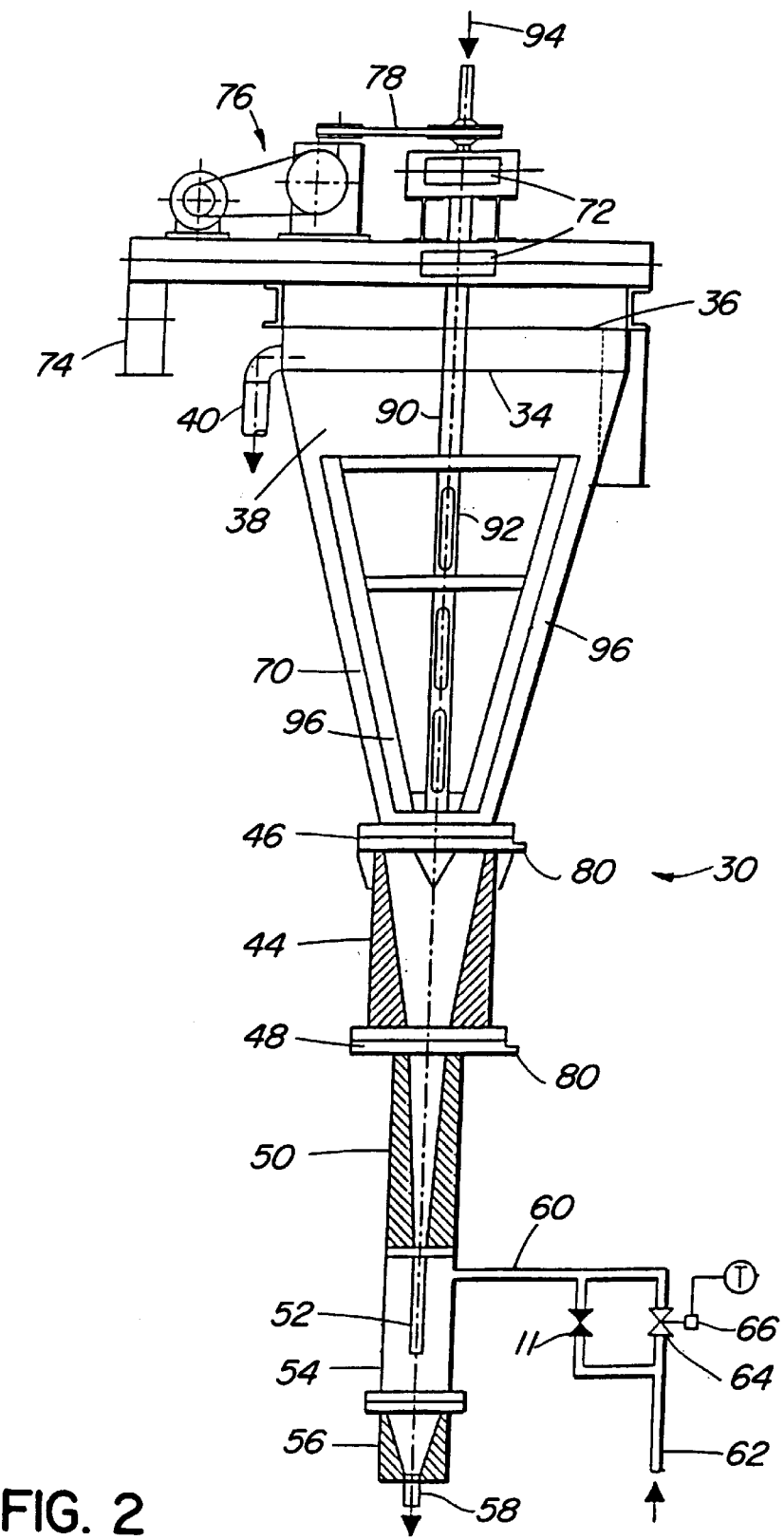
FIG. 2 is a elevation view, partly in cross-section, of the preferred form of mineral separator utilized in the process.

Referring to FIG. 2, the preferred separator apparatus is generally indicated at 30. It includes an upper cone-shaped wall 32 having an upper end 34 which is closed by a cover member 36 defining a funnel-shaped or conical upper chamber 38. An overflow tube 40 connects to chamber 38. The lower end 42 of the upper chamber 32 is connected to a conical mixing chamber 44 which has a first or upper dilution chamber 46 connected to its upper end and a second or lower dilution chamber 48 connected to its lower end. The lower side of dilution chamber 48 is connected to a lower conical portion 50 which, in turn, is connected to a high velocity tube or pipe 52, having its lower end disposed in a low velocity chamber 54. Chamber 54 is connected with a concentrate collector 56 having a discharge tube 58. The exit diameter of tube 58 must be smaller than the internal diameter of high velocity tube 52 so that substantially more of the water supplied at pipe 60 to chamber 54 will enter tube 52 rather than exit via discharge tube 58.

Water is fed from a water supply (not shown) to a pipe 62 as indicated by an arrow at the end of the pipe 62. From there the water flows through a valve 64 which is regulated in a pulsed on-off manner by a timed on-off pulse switch or actuator 66, for a reason to be explained later. A by-pass valve 68, normally closed, may be opened, and valve 64 closed, if it is desired to provide a steady flow of water to chamber 54.

An agitator or mixer 70 is mounted for rotation on brackets 72 attached to the main support for the apparatus partially shown at 74, so that the agitator is suspended within the upper chamber 38. The agitator can be rotated by a drive arrangement 76 via an endless belt or chain 78. Rotation speeds may be varied to suit the size and density of the materials being separated. A typical rotation speed is 40 rpm.

Figure 5:
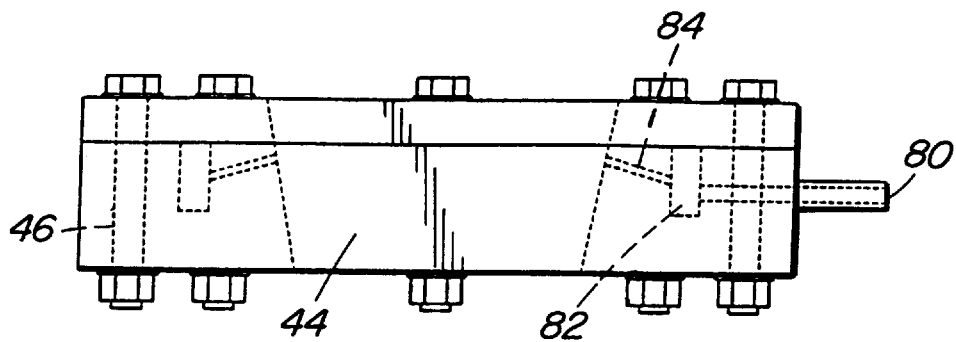
FIG. 5 is a plan view of a water dilution chamber.
Figure 4:
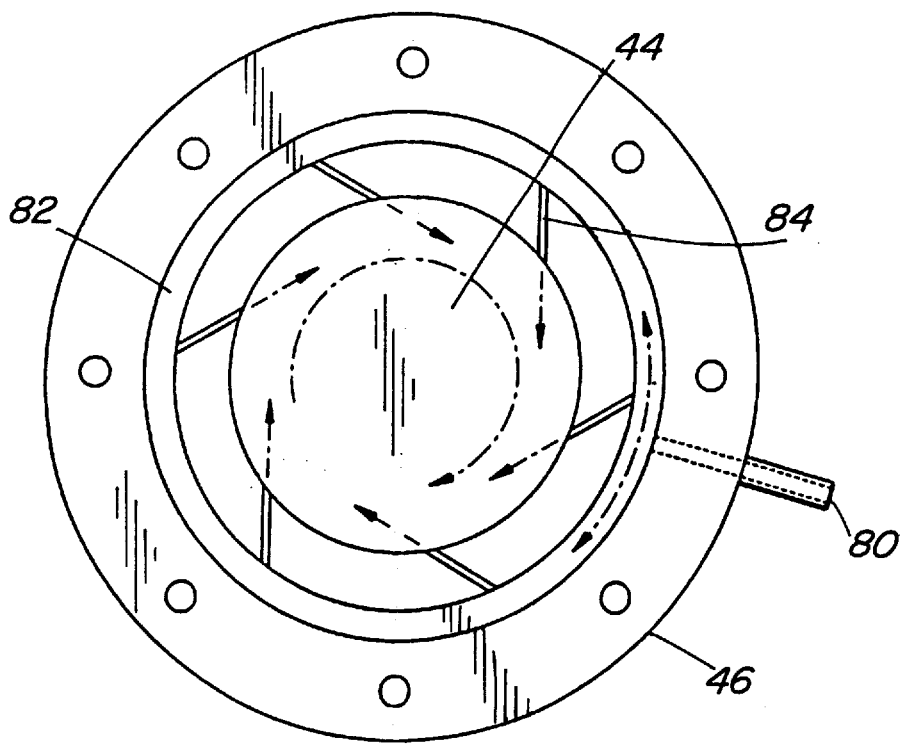
FIG. 4 is an elevation view of a water dilution chamber.

FIGS. 4 and 5 show the structure of a dilution chamber, in this case dilution chamber 46. The dilution chambers provide a means of local water velocity control. Water from a variable control feed source (not shown) is fed to dilution chamber 46 via an inlet tube 80 connected to an annular distributor ring 82 from which water is fed through multiple feeder passages 84 into the mixing chamber 44. The added water creates a centrifugal spinning motion and increases the vertical water velocity allowing additional control over particle settling rates by variation in the water feed rate. The diameter and number of feeder passages may vary, as may the vertical and horizontal angles of the passages 84. Any number of dilution chambers may be used, two being shown in FIG. 2. The dilution chambers maintain a fluidized bed of material in the lower section of the upper chamber 38.

Figure 3:
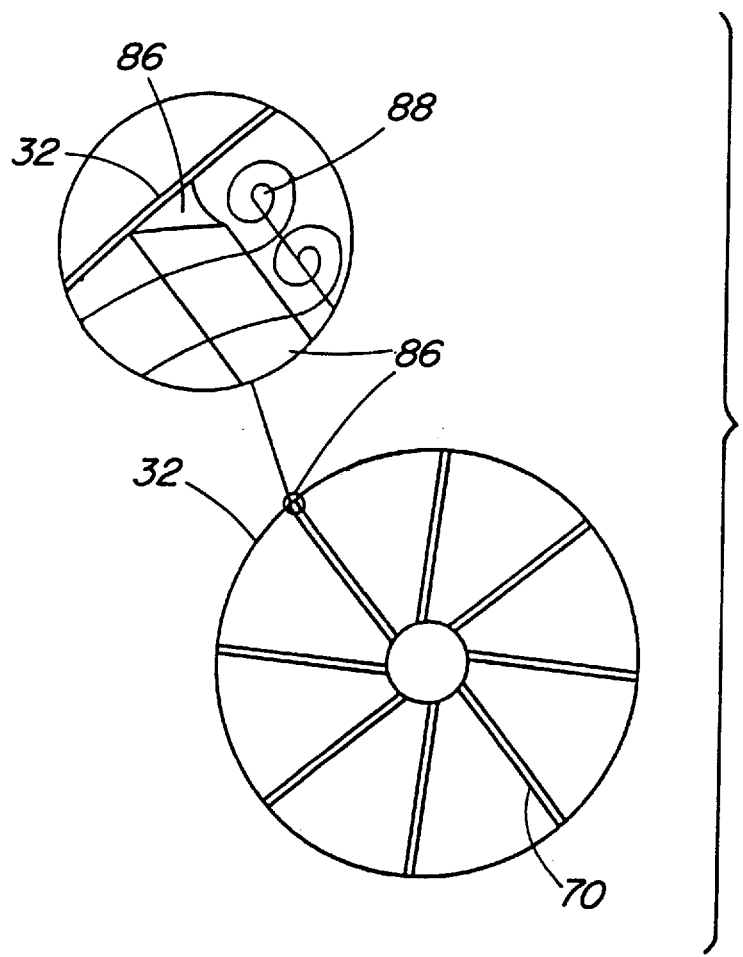
FIG. 3 is a simplified diagram illustrating and explaining the riffles provided in the upper funnel.

Referring to FIG. 2, the inner surface of the upper cone-shaped wall 32 is provided with a number of sluice riffles 86. Although not shown in FIG. 2, FIG. 3 illustrates a riffle 86. It is illustrated as roughly triangular in cross-section but could be of some other shape such as rectangular. Variations may be made in the number, length, width, height, position, material and cross-sectional shape and angle of attachment to the wall 32. Preferably, the riffles run essentially straight up and down the inner surface of wall 32. The riffles act as turbulators, similar to riffles in a conventional gold sluice, behind which zones of zero or very low velocity occur as indicated at 88 when the agitator 70 is rotating. These zones of zero or low velocity 88 allow settling out of fine (small size) heavy particles. Gravity acts on the particles in the stagnant "dead-zone" 88, causing them to move downwardly along the riffle 86 towards the base of the chamber 38.

As shown in FIG. 2, the agitator 70 includes a hollow shaft 90 provided with a plurality of openings 92. Material mixtures to be separated are fed into the top of the hollow shaft as indicated by arrow 94 and exit into chamber 38 via the openings 92. However, this is only one possible means for feeding material to chamber 38; it could, for example, be fed into the chamber 38 through an opening in the chamber wall 32 instead of through the shaft 90. The agitator 70 includes a plurality of vanes or paddles 96 running parallel to the inner wall of the upper chamber 38 and spaced therefrom so as to pass close to the riffles 86 when the agitator 70 is rotated. Rotation of the vanes 96 of the agitator 70 causes the contents of upper chamber 32 to swirl around past the riffles 86, creating the "dead-zones" 88.

In operation of the apparatus shown in the drawings, water is fed to the lower chamber 54 by main water feed 60 at a rate selected, based on experimentation, in accordance with the materials to be separated. Most of the water flows into high velocity pipe 52 and up to upper chamber 38 while some water (and separated material) flows out of discharge tube 58. Additional water is added, in mixing chamber 44, via dilution chamber 48 and in the lower end of chamber 38 via dilution chamber 46. The total water flow rate provided by the main water feed 60 and the dilution chambers 46 and 48 is adjusted so that material having a density higher than a predetermined figure can move downwardly against the upward flow of water while materials having a density lower than the predetermined figure cannot. The agitator 70 is caused to rotate and materials to be separated are fed in via the hollow shaft 90. Because of the rotation of agitator 70, which causes the water and the particles therein to swirl around in the upper chamber 38, fine particles of material of high density present in the water are subjected to centrifugal forces and tend to move out to the wall of the upper chamber 38 where they become caught in the "dead-zones" 88 behind the riffles 86. These fine particles of heavy material can then move downwardly along the wall of chamber 38 and then along the wall of mixing chamber 44 until eventually they are ejected from discharge tube 58 together with the larger sized heavy particles which have sufficient mass to be able to move downwardly against the upward flow of water. Because of the centrifugal forces created by the rotating agitator, fine particles of heavy material are directed to the wall of the chamber out of the comparatively fast upward flow of water which would otherwise carry them out of the overflow 40. Water exits the apparatus via overflow tube 40, carrying material having a density less than the predetermined figure.

As mentioned above, the main water feed 60 is preferably regulated at a pulsed rate by valve 64 activated by timed on-off switch 66. The pulsing is necessary on a continuous feed operation to allow any accumulated concentrate in high velocity pipe 52 to flow into the low velocity chamber 54 and then on to the concentrate collector 56 while the main water flow is momentarily interrupted. When the main water flow resumes, the material in the concentrate collector 56 is forcefully ejected via discharge tube 58. The exit diameter of tube 58 must be of smaller diameter than the internal diameter of high velocity tube 52, as discussed above. By adjusting the water flow rate and on-off pulse rate, the optimum discharge rate of concentrate may be achieved. The apparatus is, however, capable of being operated manually.

Having now described the basic mineral separator structure forming the subject matter of the patent applications referred to above, we will now describe the coalescing system that is to be incorporated in the mineral separator described above. This system, which is basically a sonic vibrational system, is to be incorporated in the lower settling stages of the separator. This system is used to cause the rapid but staged coalescing of the very fine or floured mercury particles. By way of further explanation it is known by those experienced in this field that fine mercury globules with clean metallic surfaces easily coalesce; however, this is not the case with fine mercury particles particularly as found in chlor-alkali sludge produced in the chlor-alkali process. These particles have been found to be coated with extremely fine residues from the process, which coatings in effect set up a barrier around each particle. Because of the above-described nature of these particles they are not amenable to gravity separation or coalescing and normally pass through to the process tailings thus decreasing the efficiency of the recovery operation.

Figure 7:
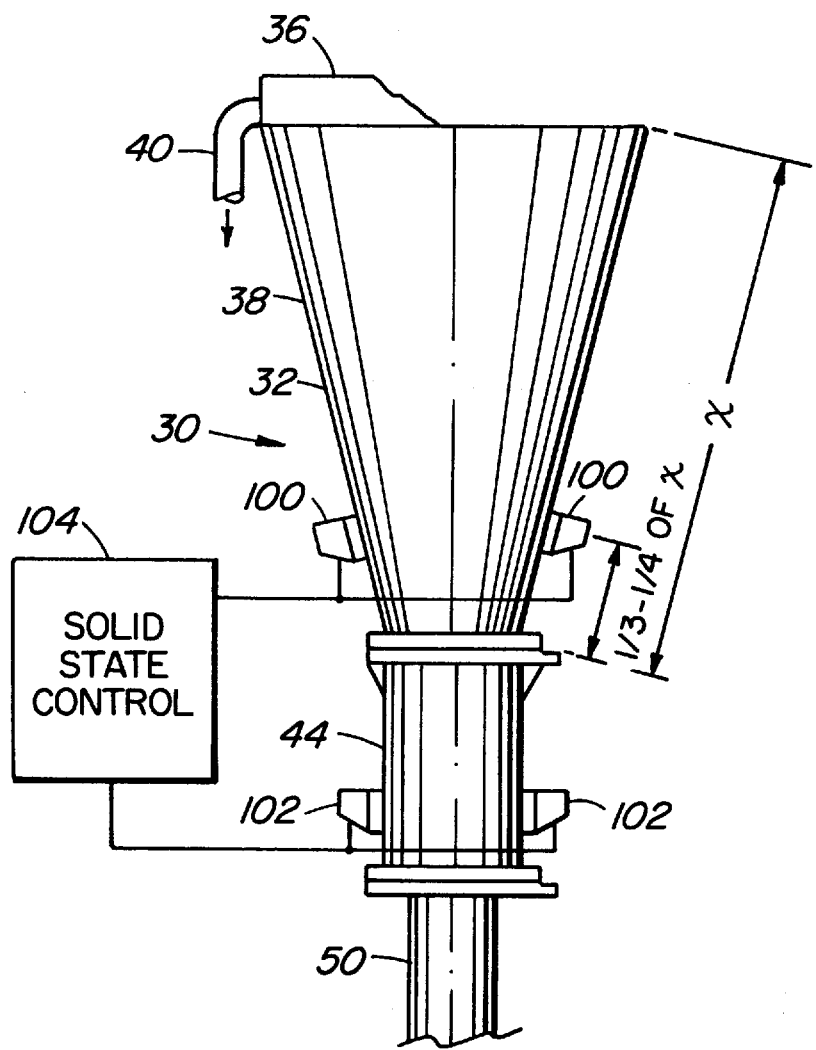
FIG. 7 is a diagrammatic representation of a portion of the hydraulic mineral separator showing the application of vibrators to the settling stages of the separator in accordance with the present invention.

The coalescing system is best illustrated in FIG. 7 which shows a portion of the mineral separator 30. In particular, the system employs the use of four vibrators mounted on the exterior of the separator as illustrated. Two vibrators 100 are diametrically opposed and fixed to chamber wall 32 adjacent the lower end of the upper chamber 38. These vibrators 100 should be positioned a distance upwardly from the bottom end of upper chamber 38 which is equal to about ¼ to about ⅓ the total length "X" of the chamber wall 32. In similar fashion a further pair of vibrators 102 are positioned diametrically opposite one another fixed to the wall of and adjacent the lower end portion of the mixing chamber 44. The vibrators 100 and 102 are preferably Model H1-V1 vibrators manufactured by ERIEZ, Series N. These vibrators are driven and controlled from a variable speed solid state controller 104 also preferably by ERIEZ. This controller has a range of up to 3600 vibrations per minute (60 Hz) on 60 cycle current.

It has been found that optimum coalescing of the fine mercury in relatively coarse materials (from about 20 to about 60 mesh range) occurs between 2000–3000 vibrations per minute. For finer materials, down to the 30 micron range, the optimum range appears to be from about 2500–3400 vibrations per minute based on preliminary testing. However, it should be understood that the nature of the slurry in the separator can vary significantly, i.e. the slurry can include silica grains, carbon, mixtures of these and others, including silt and clay fractions all of which affect somewhat the optimum vibration rate required for maximum coalescing. Routine testing and experimentation should enable those skilled in the art to provide suitable operating parameters for all materials likely to be processed by this technique. Stated differently, each material to be coalesced will have a more or less critical resonance level at which the particles of necessity will coalesce.

Figure 6:
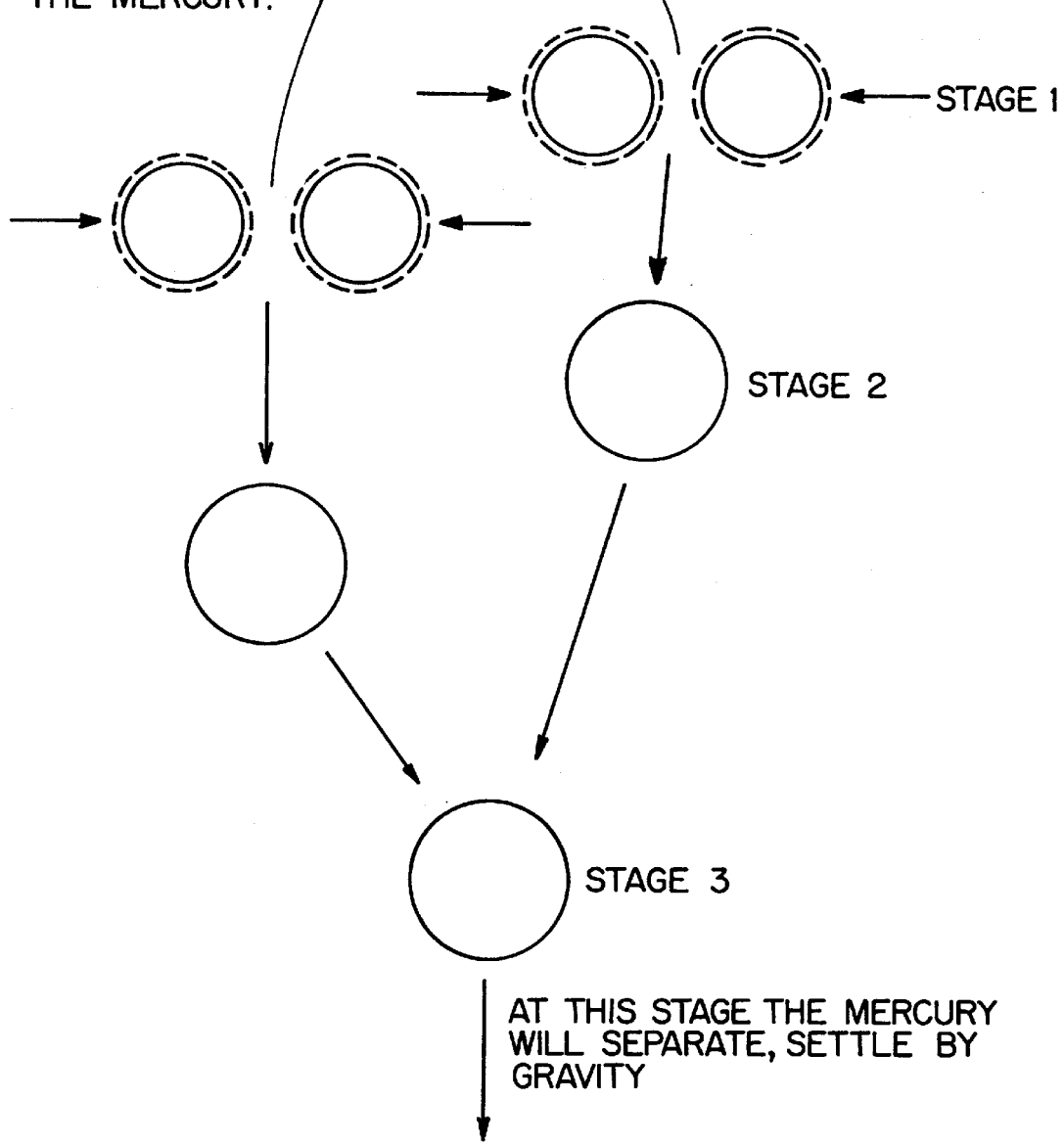
FIG. 6 is a diagrammatic illustration of the several stages involved in the coalescence of finely divided mercury particles into larger particles.

The coalescing process is illustrated in FIG. 6. In the first stage there is shown multiple pairs or groups of finely divided mercury globules each being coated with fine residues as described previously. In stage 1 these globules are separate and distinct from one another. However, with the application of the sonic vibrational energy, the vibrations in the liquid medium tend to break the surface coating thus exposing the mercury and allowing the coalescing of the mercury particles which then move as larger particles into stage 2 and, while being continually subject to the vibrational energy, again coalesce together to form still larger particles in stage 3. At this or some subsequent stage of coalescence the mercury particles will become big enough so as to separate out and settle downwardly by gravity, enabling same to move downwardly through the lower stages of the separator 30 as described above to be eventually discharged through the exit tube 58.

Figure 8:
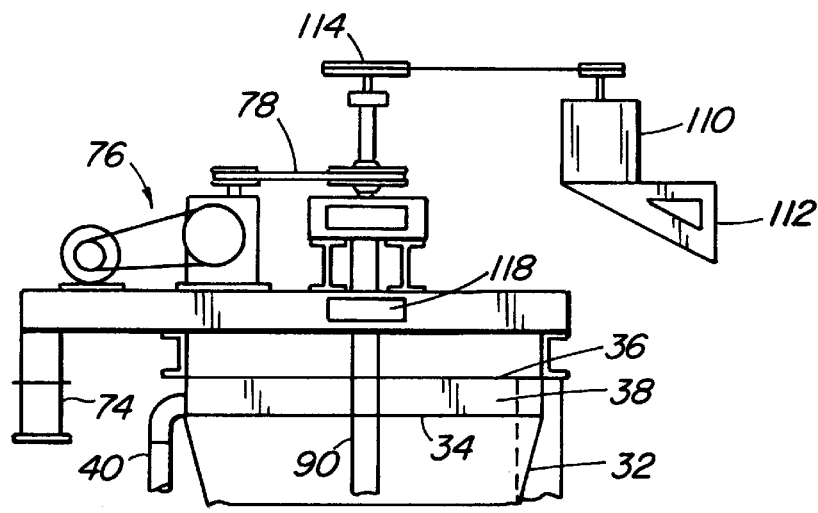
FIGS. 8, 9 and 10 are fragmentary views of a mineral separator employing an alternative mechanical arrangement for imparting vibrations to the settling stage of the hydraulic separator.
Figure 9:
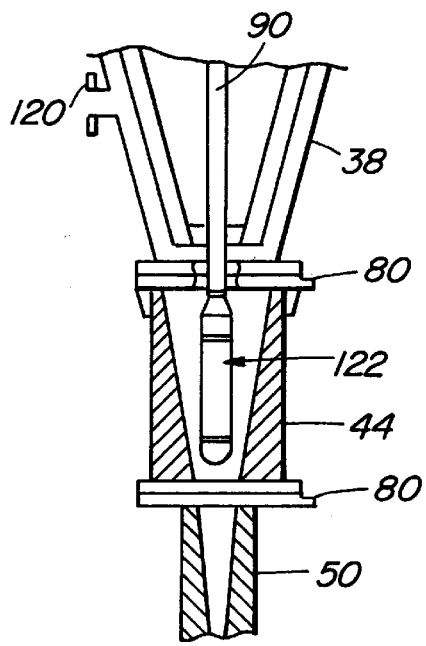
Figure 10:
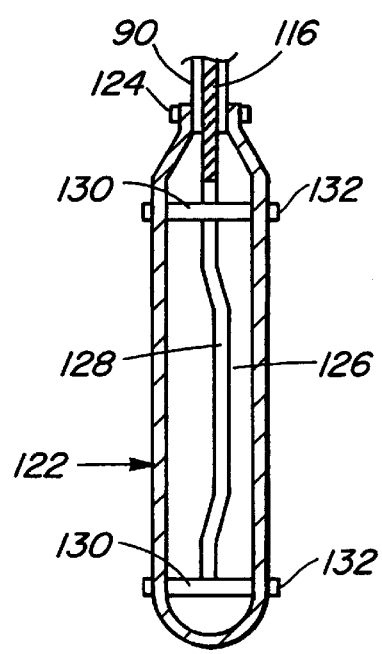

An alternative form of vibrator system is illustrated in FIGS. 8, 9 and 10. This system comprises a mechanical vibrator which is positioned within the cavity of the separator well down into the settling section of same.

With reference to FIG. 8, the mechanical vibrator is driven by a conventional 60 cycle, 1725 RPM electric motor 110 supported on mounting bracket 112 and aligned to drive pulley 114 which in turn drives a flexible drive cable 116 (see FIG. 10) which extends downwardly through the hollow mixer shaft 90 supported by bearing housing 118. In effect this configuration is a rotating shaft 116 within an outer rotating shaft 90.

Because of the use of the hollow mixer shaft 90 as a carrier for the flexible drive shaft 116, it becomes necessary to provide the wall 32 of upper chamber 38 with a feed port 120 (see FIG. 9) through which the mixture to be separated is fed into the separator.

The submersible vibrator is shown in detail in FIG. 10. An elongated rubber housing 122 is secured to the lower end of shaft 90 by means of a stainless steel clamp ring 124. The cavity 126 defined by rubber housing 122 is filled with lightweight oil (No. 1 oil).

The vibrations are supplied by an eccentric shaft 128 journalled by two small roller bearing assemblies 130 positioned in spaced apart relationship as shown in FIG. 10, which in turn are held in place within the rubber housing 122 via means of two stainless steel clamp rings 132. The upper end of the eccentric shaft 128 is firmly secured to the lower end of the flexible drive cable 116. Hence, during operation, as electric motor 110 drives the drive pulley 114, the eccentric shaft 128 is rotated thus imparting vibrational energy through the oil contained in the rubber housing 122 to the walls of this housing and in turn imparting sonic vibrational energy to the mixture contained in the mixing chamber 44 within which the rubber housing 122 is disposed as clearly illustrated in FIG. 9. During operation, the sonic vibrational energy thus generated serves to effect coalescence of the finely divided mercury particles in essentially the same manner as described previously.

Figure 11:
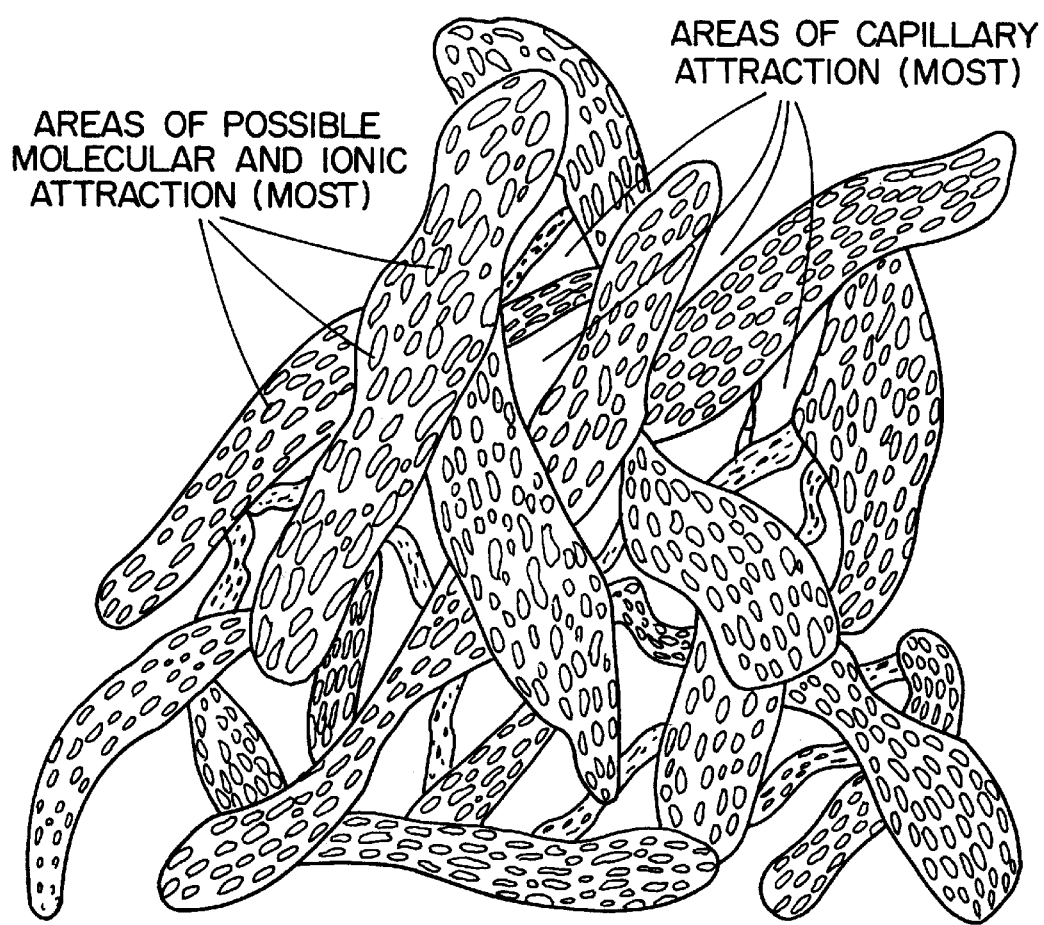
FIG. 11 is a sketch of typical peat moss substantially magnified illustrating the manner in which mercury particles become entrapped therein.

It was noted previously that suitable conditioning agents (surface active compounds) could be added to the process water which is sprayed onto the contaminated material, beginning at the initial stages of the operation at the feed hopper 10 and continuing through the various screening stages. The principal reason for adding a conditioning material relates to the fact that test work has revealed that very stubborn retention of fine mercury is encountered when processing organic type particles especially peat and related materials. Reference may be had to FIG. 11 which is a diagrammatic sketch of a fragment of peat moss material showing the intricate network of cellular structures; because of its porosity and interconnected cellular structure, the mercury particles become trapped therein and held by capillary and possibly molecular and ionic forces. In these cases the fine mercury cannot be removed by normal washing procedures even when combined with extended agitation in water. It therefore is necessary to treat this type of material in a somewhat different manner in order to obtain removal of the entrapped mercury particles.

The treatment developed involves the conditioning of the contaminated material with a compound known as sodium hexametaphosphate at relatively low percentage levels. This conditioning compound is added to all process water that is sprayed on the mercury contaminated material starting at the feed hopper 10 (see FIG. 1) and then during the subsequent screening stages, reference being had to screens 14, 16, 18 and 22. This conditioning agent alters the surface tension differential and other physical characteristics between the mercury and the organic and semi-organic material in which it is trapped, having an almost immediate effect on the mixture which results in the release or freeing-up of the mercury.

Sodium hexametaphosphate is commercially available and is sold under the trademark "CALGON". Typical Calgon usage varies depending on the percentage of organic material present in the mercury contaminated material being treated and varies depending on the particle size range of this material. This results in a rather wide range in the amount of Calgon required for any given feed to the system and may vary between a trace addition up to 0.5 to 1.0 grams per 1000 grams of process water. Obviously, for purposes of economy, the amount of Calgon added should be kept as low as reasonably possible consistent with good recovery of mercury. A small amount of routine experimentation in any given situation will quickly reveal the amounts of Calgon required for any particular application. Other types of similar conditioning compounds such as Giltex; Quadrafos; Hagan Phosphate and Micromet (which are mixtures containing sodium hexametaphosphate as the principal agent) may also be used.

The conditioning of the material to be treated thus involves the use of the above-described conditioners as indicated in the flow sheet of FIG. 1 covering the treatment of mercury contaminated media; inorganic, organic or mixtures thereof and they fall under the general description of surfactants and detersive systems. Full descriptions of these systems can be found in the standard chemical technology literature; such as Volume 22 of the "Encyclopedia of Chemical Technology" Third Edition, John Wiley & Sons or the "Encyclopedia of Chemistry" Third Edition, Reinhold Publishing Corp. This latter work states, "It has been known for many years that the polyphosphates are strong complexing agents, and this property has formed the basis of a number of industrial applications for these materials". In general, it is found that the chain phosphates (especially the longer-chain materials) form complexes with a wide variety of cations, ranging from the alkali metals to the transition metals". (Encyclopedia of Chemistry). ". . . detergent refers to a combination of surfactants with other substances, organic or inorganic, formulated to enhance functional performance, specifically cleaning, over that of the surfactant alone". (Encyclopedia of Chemical Technology). Those skilled in the art will understand that in the use of the term conditioning we mean to cover the use of compounds or mixtures of compounds that may be characterized by the use of the term detergent or surfactant. These compounds, or mixtures of these, constitute a pool of products that can be drawn on for use as conditioning agents in the system described herein and are intended to constitute a part of this process when used as an integral part of the process, i.e. in the washing and screening stages.

Example of a Working Process

One example of a working process follows:

The feed is natural geological media, i.e. till, consisting of 3" stone down to sub-micron clays. See table immediately below.

| | |
|---|---|
| 3" to 1/4 | 4% (Oversize Material) |
| 1/4 to 20 Tyler mesh | 10% (Undersize material) |
| −20 mesh to 60 mesh | 60% |
| −60 mesh to 100 mesh | 15% |
| −100 mesh | 11% |

Typical size range for primary screen is ¼" mesh Tyler. Typical size for the secondary screen is 10 mesh.

The average soil being treated at this site will run approximately 80% silica. The feed routinely ran 3% mercury by weight. The feed slurry ran, on average 20%–25% solids, at a total average feed rate of 2.5 to 3.0 metric tonnes/hour and as high as 5 metric tonnes/hour. Tertiary screen 1 is a 20 mesh screen. Tertiary screen 2 is a 60 mesh screen. Tertiary screen 1 feeds separator No. 1 and Tertiary screen 2 feed separator No. 2. Screen 1 above has a cleaned discharge of −10 to +20 mesh (i.e. less than 10 to greater than 20 mesh) material and screen 2 has a cleaned discharge of −20 to +60 sands. Both discharges are mercury free below acceptable levels of 0.25 PPM.

The overflow from separator No. 2 carries sands with a grain size average of −60 mesh, which is routed to the settling system and carries routinely values in the range of 0.25 PPM. This settling system constitutes the first stage of the settling and water treatment system; here the suspended solids are removed by a standard water treatment system of precipitation by coagulation using aluminum sulphate (equivalent) in a restricted Ph range of 4 or less. The cleaned water is stripped of trace levels of any metals remaining by use of an activated carbon filtration system. This polishing step yields a finished water that routinely has levels of mercury acceptable to municipal water treatment plants. This water constitutes the recycled water used in the process.

Preferred embodiments of the invention have been described and illustrated by way of examples. Those skilled in the art will realize that various modifications and changes may be made while still remaining within the spirit and scope of the invention. Hence the invention is not to be limited to the embodiments as described but, rather, the invention encompasses the full range of equivalencies as defined by the appended claims.

What is claimed:

1. A process for the separation of higher density minerals from lower density minerals comprising supplying material in the form of a mixture of liquid and particulate material in a selected particle size range to a hydraulic mineral separator; maintaining a generally upwardly flowing stream of liquid in said separator while said mixture is supplied to the upwardly flowing stream such that higher density minerals fall downwardly by gravity forces against the upwardly flowing steam while the lower density minerals are moved upwardly by said stream; and removing the downwardly moving higher density minerals from said separator through a lower discharge opening while the upwardly moving lower density minerals are removed via an upper outlet opening and supplying sonic vibrations to the mixture within the separator to induce the higher density mineral particles to coalesce together and form larger particles which more readily settle downwardly toward the discharge opening to enhance the recovery of the higher density minerals.

2. The process according to claim 1 wherein the higher density mineral is mercury, a portion of which is in the form of very fine or residue-coated mercury particles which tend not to settle downwardly within the separator.

3. The process of claim 2 wherein said sonic vibrations have a frequency of about 2000 to about 3400 cycles/minute.

4. The process according to claim 2 including adding a conditioner to the material to reduce surface tension effects which tend to bind the mercury particles to other media such as organic particles.

5. The process according to claim 4 wherein said conditioner is hexamethaphosphate, said conditioner being applied in sprays of water to said material in the course of screening of same prior to being fed into the hydraulic mineral separator.

6. The process of claim 2 wherein the material supplied is a mixture of mercury contaminated soil and water, the soil particles being in a screen size range of less than about 20 mesh.

7. The process of claim 6 wherein the soil particles are of a size greater than about 30 microns.

8. Apparatus for the separation of higher density minerals from lower density minerals comprising a hydraulic mineral separator including:

means defining an upright flow passage;

means for supplying process liquid to said passage to maintain a generally upwardly moving stream of liquid therein during use;

means for supplying a mixture of liquid and particulate material to be separated to said passage;

an overflow means above said passage for discharging liquid and lower density particles;

a discharge means below said passage for discharging liquid and higher density particles which have moved down by gravity against the upflowing stream of liquid; and vibrator means for effecting sonic vibrations in the mixture of particulate material within said flow passage to cause coalescence of selected finely divided minerals to enhance recovery of same via said discharge means.

9. Apparatus according to claim 8 when adapted for recovery of finely divided metallic mercury particles.

10. Apparatus according to claim 9 wherein said vibrator means is capable of providing vibrations in the range of about 2000 to at least about 3400 cycles/minute.

11. Apparatus for separating a first particulate material having a selected higher density from a liquid mixture with at least one other particulate material having a lower density, said apparatus comprising a chamber intended to be placed in an upright position and increasing in size from a lower small end toward an upper large end, said chamber having a wall with an inner surface and an outer surface, a plurality of riffles on said inner surface extending from adjacent said lower end to adjacent said upper end, an agitator mounted for rotation within said chamber, said agitator comprising a plurality of vanes extending from adjacent said lower end upwardly to adjacent said upper end, each said vane having an outer edge adapted to move past said riffles in close proximity thereto upon rotation of said agitator, means for rotating said agitator, means for feeding said mixture into said chamber, a first means for supplying liquid to the lower end of said chamber, overflow means for removing liquid and lower density materials from the upper end of said chamber, means to remove said first higher density material which has been separated from the lower end of said chamber; and vibrator means for effecting sonic vibrations in the mixture of material being separated within said chamber to induce coalescence of selected finely divided particles of the first higher density material to form larger particles thereof and to enhance the separation of same.

12. Apparatus according to claim 11 when adapted for separation of a first material comprising finely divided metallic mercury from a lower density material.

13. Apparatus according to claim 12 wherein said vibrator means is capable of producing vibrations in the range of about 2000 to at least about 3400 cycles/minute.

14. Apparatus as claimed in claim 12 including a second means for supplying additional liquid to the lower end of said chamber.

15. Apparatus as claimed in claim 14 and further comprising a cone-shaped mixing chamber, said mixing chamber having an upper end connected to said means for supplying additional liquid to the lower end of said first-mentioned chamber.

16. Apparatus as claimed in claim 15 wherein said vibrator means includes a first vibrator secured to said wall of said first-mentioned chamber to impart vibratory motion thereto.

17. Apparatus as claimed in claim 16 wherein said vibrator means includes a second vibrator secured to a portion of said mixing chamber to impart vibratory motion thereto.

18. Apparatus as claimed in claim 15 wherein said means for supplying additional liquid to the lower end of said first-mentioned chamber comprises a dilution chamber.

19. Apparatus as claimed in claim 18 wherein said mixing chamber has a lower end connected to a further dilution chamber.

20. Apparatus as claimed in claim 19 wherein said further dilution chamber is connected to a lower cone-shaped portion.

21. Apparatus as claimed in claim 20 wherein said lower funnel portion is connected to a high velocity pipe disposed in a low velocity chamber connected to a primary source of said liquid.

22. Apparatus as claimed in claim 21 wherein said low velocity chamber is connected to a concentrate collector for collecting said first material and said concentrate collector is connected to a discharge tube for discharging said first material.

23. Apparatus as claimed in claim 21 including means for periodically momentarily interrupting said first means for supplying liquid to the lower end of said funnel.

24. Apparatus as claimed in claim 19 wherein each said dilution chamber comprises an inlet tube connected to an annular distribution ring and a plurality of feeder passages.

25. Apparatus according to claim 11 wherein said vibrator means is located adjacent the lower end of the first mentioned chamber so as to be directly within the liquid mixture when the apparatus is in use.

26. The apparatus according to claim 15 wherein said vibrator is located within said cone-shaped mixing chamber.

27. A method for separating a first material in particulate form having a selected higher density from a liquid mixture with at least one other particulate material having a lower density, comprising feeding said mixture into a funnel-shaped chamber having a lower small end and an upper large end, said chamber having an inner surface and an outer surface and having a plurality of riffles on said inner surface, supplying liquid to the lower end of said chamber from a primary source and removing liquid from the upper end of said chamber to create an upward flow of fluid, causing said liquid and the mixture contained therein to swirl around in said chamber whereby fine particles of said first material are captured in "dead-zones" created by said riffles and move downwardly in said chamber together with larger particles of said first material which move downwardly through said upward flow of liquid while said at least one other material is moved toward the upper end of said chamber by the upward flow of said liquid and is removed from the upper end of said chamber together with a portion of the liquid removed to create said upward flow, removing said first material from the lower end of the chamber, and wherein the first higher density material includes, a portion which is in the form of very fine or residue coated particles which tend not to settle downwardly within the chamber, and supplying sonic vibrations to the liquid and mixture contained therein while within said chamber to induce the fine particles to coalesce together and form larger particles which more readily settle downwardly toward the lower small end to enhance the recovery of same.

28. The process of claim 27 wherein the higher density material comprises metallic mercury.

29. The process of claim 28 herein said sonic vibrations have a frequency of about 2000 to about 3400 cycles/minute.

30. The process according to claim 28 including adding a conditioner to the material to be separated to reduce surface tension effects which tend to bind the mercury particles to other media such as organic particles.

31. The process of claim 30 wherein said conditioner is hexamethaphosphate.

32. The process according to claim 27 wherein the particulate material is screened to a size less than about 20 mesh before being fed into said chamber.

33. A method as claimed in claim 27 and further comprising periodically momentarily interrupting said supplying of liquid by said primary source.

34. A method as claimed in claim 33 further comprising supplying additional liquid from at least one secondary source disposed between said primary source and said chamber.

35. A method as claimed in claim 34 wherein said liquid is water.

* * * * *